United States Patent [19]

Corey

[11] Patent Number: 5,153,806
[45] Date of Patent: Oct. 6, 1992

[54] TRANSIENT SURGE SUPPRESSOR AND ALARM SIGNAL CIRCUIT

[76] Inventor: Lawrence G. Corey, UMC Electronics, 460 Sackett Point Rd., North Haven, Conn. 06473

[21] Appl. No.: 363,480

[22] Filed: Jun. 7, 1989
(Under 37 CFR 1.47)

[51] Int. Cl.⁵ ............................................. H02H 3/20
[52] U.S. Cl. ........................................ 361/56; 361/91; 361/127; 340/652; 340/662
[58] Field of Search ............... 361/56, 91, 104, 111, 361/127; 340/638, 652, 662

[56] References Cited

U.S. PATENT DOCUMENTS

| | | | |
|---|---|---|---|
| H248 | 4/1987 | Middlebrooks | 340/639 |
| 4,004,201 | 1/1977 | DePuy. | |
| 4,023,077 | 5/1971 | Fussell | 361/56 |
| 4,068,281 | 1/1978 | Harnden, Jr. | 361/106 |
| 4,089,032 | 5/1978 | Dell Orfano | 361/56 |
| 4,152,743 | 5/1979 | Comstock | 361/56 |
| 4,168,514 | 9/1979 | Howell | 361/56 |
| 4,259,705 | 3/1981 | Stifter | 361/56 |
| 4,271,446 | 6/1981 | Comstock | 361/56 |
| 4,563,720 | 7/1986 | Clark | 361/56 |
| 4,584,622 | 4/1986 | Crosby et al. | 361/56 |
| 4,586,104 | 4/1986 | Standler | 361/91 |
| 4,587,588 | 5/1986 | Goldstein | 361/54 |
| 4,616,286 | 10/1986 | Breece | 361/56 |
| 4,628,394 | 12/1986 | Crosby et al. | 361/56 |
| 4,630,163 | 12/1986 | Cooper et al. | 361/56 |
| 4,649,457 | 3/1987 | Talbot et al. | 361/127 |
| 4,652,963 | 3/1987 | Fahlen | 361/16 |
| 4,688,135 | 8/1987 | Leopold | 361/118 |
| 4,698,721 | 10/1987 | Warren | 361/110 |
| 4,720,760 | 1/1988 | Starr | 361/128 |
| 4,739,436 | 4/1988 | Stefani et al. | 361/56 |
| 4,740,859 | 1/1989 | Little | 361/56 |
| 4,807,083 | 2/1989 | Austin | 361/111 |

Primary Examiner—Todd E. DeBoer
Attorney, Agent, or Firm—Wigman & Cohen

[57] ABSTRACT

An alarm circuit for a transient voltage suppression circuit for protection of equipment using alternating current power is shown and described. This device utilizes a pair of diodes having the same terminals (polarity) connected to a node to which a resistor provides an AC voltage. The diodes conduct during one half cycle in normal operation, and the node is at a virtual ground when both diodes conduct. When a fuse from one diode to ground opens, current no longer flows and the voltage at the node rises as the other diode conducts and applies a voltage to resistors and an alarm input.

There is also disclosed a suppression circuit which provides for isolation of the ground from neutral in the event of failure of the varistor.

16 Claims, 1 Drawing Sheet

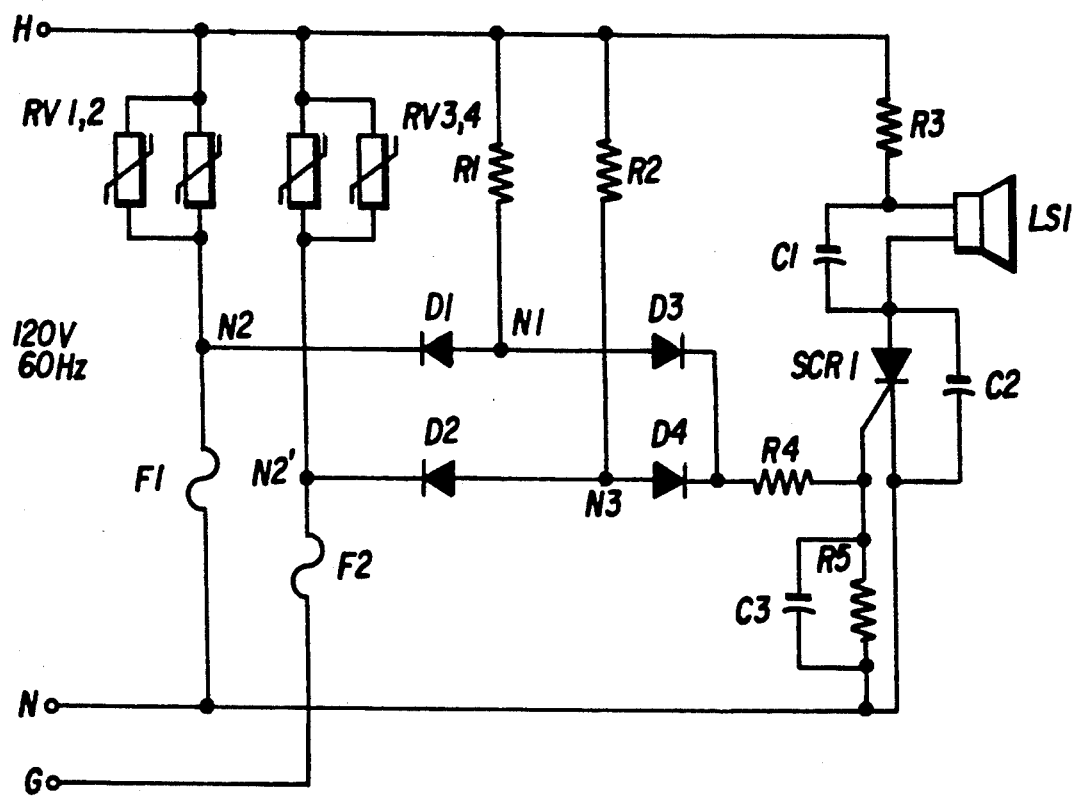

TRANSIENT SURGE SUPPRESSOR AND ALARM SIGNAL CIRCUIT

BACKGROUND OF THE INVENTION

This invention relates to surge suppressors which use metal oxide varistors (MOV) to prevent transient voltages in electrical distribution systems from reaching electrical equipment supplied by the system. The use of surge suppressors is common where sensitive equipment must be protected from transients superimposed on the line voltage. The invention provides for a signal to indicate that the protective function of the surge suppressor has been lost due to a varistor failure. The invention also prevents the establishment of an undesired low impedance connection between neutral and grounding circuit conductors as a result of MOV failures. The usual failure mechanism of an MOV is to go into a low resistance mode. This invention may be incorporated in an electrical receptacle.

DESCRIPTION OF THE PRIOR ART

In the prior art there have been many circuits which incorporate varistors for the purpose of providing surge suppression on lines which supply current to voltage sensitive equipment. Prior art devices generally do not assure isolation of grouding and neutral conductors, and they do not provide a simple detection circuit which relies upon diodes to isolate different detection and power circuits.

U.S. Pat. No. 4,089,032 to Orfano teaches the use of fuses to protect from transients on the supply lines, but not on the ground circuits.

U.S. Pat. Nos. 4,584,622 and 4,628,394 to Crosby et al teach surge suppression protection from line to line and line to neutral, but do not provide for fused connections to grounding conductors and a failure indicator.

United States Statutory Invention Disclosure H248 teaches the use of an audible alarm which is triggered by two different possible fuse failures with diodes D3 and D4 for the prevention of current flow to a second visual alarm and to another voltage line.

U.S. Pat. No. 4,740,859 to Little shows the use of a varistor in series with a fuse, but the fuse is located at the line side of the varistor and there is no protection provided against surges from the neutral conductor. U.S. Pat. No. 4,152,743 to Comstock also shows fuses placed on the line side of a circuit in combination with varistors.

U.S. Pat. No. 4,688,135 shows a fuse in series with an MOV where the fuse is connected to the neutral. In this circuit, even if the fuse opens up, there remains a path through the alarm circuit between the neutral and the high voltage.

U.S. Pat. No. 4,023,071 shows a varistor in series with a fuse which has an indicator light in parallel with the fuse. This disclosure does not contemplate protection for a separate neutral conductor, or providing one warning signal for a plurality of circuits which are protected by fuses and varistors.

In the prior art devices known to applicant, the surge suppressors will not prevent connections between neutral and ground conductors in response to low resistance MOV failure without sacrificing some degree of transient protection.

SUMMARY OF THE INVENTION

This invention provides for protection from transient voltages superimposed on the normal voltage of alternating current systems by use of two or more varistor-fuse series pairs. The fuses are connected to the ground and neutral side, and the varistors, MOV's (Metal Oxide Varistors), are each connected to the hot line. If either varistor fails, causing excessive current to flow through the fuse connected to it, the fuse will open. The fuse location at the neutral or ground of this invention assures that a low resistance path, if established, cannot be maintained between other than a neutral conductor or the grounding conductor and the line conductor when there is a varistor failure. The fuse locations also assure that the circuit neutral lead does not come into electrical contact with the circuit ground even if both MOVs fail because the circuit neutral and the circuit ground are connected by varistors to the hot circuit conductor and not to each other. Except in special cases, it is considered unsafe for connections to exist between the neutral and grounding connectors anywhere downstream of the service equipment.

In this invention, a sensing and signaling circuit continuously monitors the MOV-fuse circuits to warn of total or partial loss of the transient protection or loss of continuity of the equipment grounding circuit. The sensing circuit detects a loss of continuity between the fuse-MOV junction in the suppressor and the neutral and grounding conductors junction in the service. Opening of either fuse or either the neutral or grounding conductors upstream of the suppressor will signal a warning or alarm.

This invention utilizes one output signaling device which is a speaker driven by a silicone controlled rectifier. Obviously any signaling device such as a light or sound may be used. The invention provides a single signal to the signaling device when two or more line to ground and/or neutral lines are being monitored.

The foregoing and other objects, features and advantages of the present invention will become more apparent in the light of the foregoing detailed description of the preferred embodiments thereof as illustrated in the accompanying drawing.

BRIEF DESCRIPTION OF THE PREFERRED EMBODIMENT

FIG. 1 is a schematic drawing of the varistors, fuses, and alarm of the present invention.

In FIG. 1 there is shown a circuit diagram of the surge suppressor and alarm system of this invention. Varistors RV 1,2,3, and 4 are connected to fuses F1 and F2 at nodes N2 and N2'. Typically, when metal oxide varistors fail, they short circuit and draw sufficient current to cause the fuse connected in series with them to open. In this invention, the sensing means and alarm means respond to the open fuse condition, indicating that the varistor has failed.

A resistor R1 has one terminal to the circuit conductor H which supplies alternating current voltage. When diode D1 is conducting during a half cycle, the node N1 is effectively clamped to ground. During this same half cycle when the fuse F1 opens, the diode D3 will conduct and a voltage will be supplied to the resistor R4 which is connected to the gate of the SCR1. During the opposite half cycles, the diodes D1 and D3 do not conduct. The circuit F2, D2, and D4 operates in the same manner as F1, D1, and D3.

The node N2 is formed at the junction of F1, and RV 1,2. Connected to node N2 is a diode D1 which has its other terminal connected to a first node, N1. A resistor R1 has one end connected to the node N1 and has its other end connected to the source of alternating current voltage H.

Also connected to the first node is diode D3 which has its other terminal connected to one side of R4. R4 is in turn connected to the gate of SCR1. SCR1 is used to turn on and off power from the alternating current source H to the loud speaker LS1.

The diodes D1 and D3 have the same terminal (i.e. polarity) connected to node N1. If diode D1 has a forward voltage across it to ground at F1, diode D2 will also have a forward voltage to ground through the path formed by resistors R4 and R5. Since the voltage from the source H to diodes D1 and D3 through resistor R1 is alternating, there is no requirement that the polarity of the diode be in either direction, the only requirement is that they all be the same with respect to the node N1.

The normal operation of this circuit (i.e. fuses are closed) is best understood by considering the response of the circuit to the positive half and the negative half cycle respectively. When diodes D1 and D3 have the polarity shown, they will conduct during the positive half cycle. The diodes have a small forward conducting voltage and the node N1 is effectively clamped to ground through D1 and F1. Also during the positive half cycle, there is a path to ground through diode D3 and R4, R5 although the voltage across diode D1 discussed above, and the current is effectively zero. This leaves the junction of R4 and R5 at zero and the SCR1 will not be turned on. The voltage applied to the gate of SCR1 during the positive half cycle, and when fuse F1 is in place, is essentially zero because the forward conducting voltage of D3 is the same as D1. There is no significant voltage across R4 and R5 in this condition.

Also during normal operation, when the negative half cycle of the power source H is present, the diodes D1 and D3 do not conduct and there is no current which can be supplied to the gate of SCR1 by way of resistor R4.

When there is an open fuse condition, such as where fuse F1 is open, and the positive half cycle of the voltage source H is present, the diode D3 conducts, but the diode D1 does not, because it has no path to ground. When diode D3 conducts, the voltage across R1, R4, R5 and the diode is equal to the voltage H because all of the current flows through diode D3. In this condition, the voltage across the SCR1 gate is the positive voltage across resistor R5, and parallel capacitor C3.

The diodes D2 and D4 are also connected so that their polarity is the same with respect to node N3. Their function during the positive half cycle and the negative half cycle is the same as described for diodes D1 and D3. Therefore, if fuse F2 should open, there will be a current from R2, R4 and R5 during the positive half cycle. The diodes D3 and D4 each block current which is flowing through the other during a positive half cycle. This blocking assures that the current from diode D3 must flow to resistor R4 and not to ground through diode D4 and fuse F2.

The invention requires that the fuses F1 and F2 be placed on the ground and neutral sides of the varistors RV 1,2,3, and 4. The placement of the fuses prevents any possibility of neutral to ground contact through the circuitry of the alarm such as the path through a diode (D1, D3, D2, or D4), through resistors R4 and R5, through SCR1, and through capacitor C3.

In all building wiring in accordance with the National Electrical Code, the ground and neutral are bonded together at the service equipment, but must remain separate throughout the wiring system. For this reason, it is desirable to prevent current flow between ground and neutral within a surge suppressor.

Since the fuses are connected to the ground and the neutral wires, the presence of an open ground or an open neutral will be responded to as if it were an open fuse. This feature provides warning of an open ground or an open neutral, either of which is a potential hazard to equipment or personnel.

The SCR1 is used to turn on the speaker LS1. Resistor R3 is used to limit the current through the speaker and SCR which is connected directly to ground. The SCR is turned on when a sufficient voltage is applied to the gate at the junction of R4 and R5 by conduction of diodes D3 and D4 when fuse F1 or F2 is open.

In the preferred embodiment, the following values have been found to be satisfactory, although other values may be used.

| | | |
|---|---|---|
| R1 | 82k ohm | ¼ watt |
| R2 | 82k ohm | ¼ watt |
| R3 | 39k ohm | 2 watt |
| R4 | 20k ohm | ¼ watt |
| R5 | 510 ohm | ¼ watt |
| F1 and F2 | | 10 watt |
| D1, D2, D3, D4 | 1 amp, 400 PIV, .6 volts | |
| C1 | 4.7 ufk 10 volt | |
| C2 | .01 uf, 400 volt | |
| C3 | .01 uf, 35 volt | |

The capacitor C2 acts as a snubber circuit across the SCR1 and slows the rate of forward voltage rise. The capacitor C3 across R5 provides an RF bypass for the gate of SCR1 and R5. The capacitor C1 provides a high frequency shunt for the speaker LS1.

Although the invention has been shown and described with respect to a best mode embodiment thereof, it should be understood by those skilled in the art from the foregoing that various other changes, omissions and deletions to this invention may be made without departing from the sprit and scope of this invention.

What I claim is:

1. Surge control apparatus interposed between an electrical circuit conductor, an electrical circuit ground, and an electrical circuit neutral, comprising:
   first and second varistor-fuse combinations forming two series circuits, each having a varistor connected to a fuse,
   means for connecting the varistor end of each of said first and second varistor-fuse series circuits to said electrical circuit conductor,
   means for connecting the fuse end of said first varistor-fuse series circuit to said circuit ground,
   means for connecting the fuse end of said second varistor-fuse series circuit to said circuit neutral,
   means for detecting an open circuit at each of said fuses,
   wherein said means for detecting comprises:
   two first diodes each having a respective first lead connected to a varistor-fuse connection, said diodes each having respective second leads, two first resistors, each connected between a respective second lead of one of said diodes and said electrical circuit conductor, and two second diodes, each connected between the respective connection of each of said first diode and said resistor to couple said second diodes to a single circuit adapted to control an alarm connected to signal the presence of an open circuit fuse.

2. The apparatus of claim 1 further including means for monitoring said fuses to determine if one or more of said fuses has opened.

3. The apparatus of claim 2 wherein said means for monitoring comprises a means for generating a sound output signal if one or more of said fuses open.

4. The apparatus of claim 2 wherein the said means for monitoring derives power from said electrical circuit conductor and the circuit neutral.

5. The apparatus of claim 1 wherein the failure of at least one of the varistors connected to at least one of said fuses permits a flow of current sufficient to open at least one of said fuses, thereby electrically isolating the respective conductor connected to the open fuse.

6. A surge control apparatus interposed between an electrical circuit conductor, an electrical circuit ground, and an electrical circuit neutral, said apparatus further including an open ground circuit detection device, comprising in combination:

a varistor having a first lead connected to said circuit conductor, and a second lead, a fuse connected between said varistor second lead and said circuit ground, means for sensing connected to the fuse-varistor connection, and means for energizing said sensing means comprising separate connections to said electrical circuit conductor and to said circuit neutral, whereby said sensing means is adapted to detect an open circuit between said fuse-varistor connection and said circuit ground.

7. The apparatus of claim 6 wherein said open circuit is an open fuse between the ground circuit and the fuse-varistor connection.

8. Surge control apparatus interposed between an electrical circuit conductor, an electrical circuit ground, and an electrical circuit neutral, comprising:

first and second varistor-fuse combinations forming two series circuits, each having a varistor connected to a fuse, means for connecting the varistor end of each of said first and second varistor-fuse series circuits to said electrical circuit conductor, means for connecting the fuse end of said first varistor-fuse series circuit to said circuit ground, means for connecting the fuse end of said second varisor-fuse series circuit to said circuit neutral, and means for detecting an open circuit at each of said fuses, wherein said means for detecting further comprises:

two first diodes each having a respective first lead connected to a respective varistor-fuse connection, said diodes each having respective second leads, two first resistors, each connected between a respective second lead of one of said diodes and said electrical circuit conductor, and two second diodes, each connected between the respective connection of each of said first diode and said resistor to couple said second diodes to a single circuit adapted to control an alarm connected to signal the presence of an open circuit fuse.

9. A detector circuit adapted to detect the presence of an alternating current voltage at a plurality of different nodes, comprising in combination:

at least one first node and a plurality of second nodes;

an alarm circuit including an alarm having a control terminal controlled by said detector circuit, a plurality of voltage detecting leads, each connected to a respective one of said second nodes, each of said voltage detecting leads having a first diode connected to it by a respective first end thereof, each of said first diodes having a resistor connected by a first end thereof to a second end of said diode, said resistor-diode connections forming first nodes, and said resistors having second ends, each of said resistors being connected by its respective second end to said alternating current voltage, and a plurality of second diodes each connected by a first end thereof to one of said first nodes, each respective one of said second diodes having a second end connected to said alarm circuit, wherein said alarm is energized when any one of said second diodes is forward-biased and a voltage is applied to said control terminal.

10. The circuit of claim 9 wherein said plurality of nodes to be protected have a surge protecting varistor connected to a fuse forming second nodes.

11. The apparatus of claim 9 wherein said first and second diodes are directed in the same direction with respect to said first nodes.

12. The apparatus of claim 9 wherein said fuses have their respective second ends connected to a conductor at ground potential.

13. The apparatus of claim 9 wherein an alternating voltage is present at each of said first nodes and each said first node has a first one-half cycle clamped to ground through said first diode which is connected to said second node, and is at half-wave voltage during the second half-cycle such that said first diode blocks the path to ground at said second node.

14. The apparatus of claim 13 wherein, when a fuse connected to said second node is open, the voltage for said first one-half cycle is not clamped to ground, and the voltage at said first node will rise and signal an alarm condition when said second diode becomes forward biased.

15. The apparatus of claim 9 wherein said alarm is a sound generating device.

16. In an alternating circuit including a joined fuse-varistor series circuit having one lead of said fuse connected to ground potential and one lead of said varistor connected to an alternating current voltage, the method of detecting an open circuit fuse comprising the steps of:

sensing when the voltage at said fuse-varistor series circuit junction varies from ground potential during a first half-cycle of said alternating voltage, thereby indicating that said fuse has opened, and passing an alternating current to the input of an alarm circuit during said first half-cycle by a current flow from a first node which is controlled by a diode connected between said junction and said means for sensing.

* * * * *